United States Patent [19]

Sloop

[11] 4,078,170
[45] Mar. 7, 1978

[54] PHOTOGRAPHIC REFLECTOR ACCESSORY

[76] Inventor: Conrad Beebe Sloop, 9092 Bermuda Dr., Huntington Beach, Calif. 92646

[21] Appl. No.: 629,532

[22] Filed: Nov. 6, 0975

[51] Int. Cl.$^2$ ............................................... F21V 7/10
[52] U.S. Cl. ................................... 362/322; 354/126; 350/288; 362/16
[58] Field of Search ...................... 354/80, 81, 82, 126, 354/145, 293; 240/1.3, 103 R, 103 A; 350/117, 124, 288, 295, 299, 300, 305; 135/3 R, 5 C, 5 D, 7.1 R

[56] References Cited

U.S. PATENT DOCUMENTS

| | | | |
|---|---|---|---|
| 3,255,467 | 6/1966 | Kowalski | 135/7.1 R |
| 3,604,913 | 9/1971 | Crete | 240/1.3 |
| 3,712,978 | 1/1973 | Lowell | 240/1.3 |
| 3,781,535 | 12/1973 | Larson | 354/126 |
| 3,843,238 | 10/1974 | Rushing | 350/288 |
| 3,851,164 | 11/1974 | Intrator | 240/103 |
| 3,852,582 | 12/1974 | Lowell | 240/1.3 |
| 3,939,340 | 2/1976 | Gozzano et al. | 240/103 R |
| 3,942,869 | 3/1976 | Portner | 350/117 |
| 3,970,835 | 7/1976 | Crete | 240/1.3 |

Primary Examiner—L. T. Hix
Assistant Examiner—Alan Mathews
Attorney, Agent, or Firm—Lindenberg, Freilich, Hornbaker, Wasserman, Rosen & Fernandez

[57] ABSTRACT

Apparatus for use with a camera and flash unit to provide diffused light, including a support frame for holding a flash unit so it emits light upwardly, and for holding a reflector screen above the flash unit and facing forwardly and downwardly to reflect light from the flash unit in a largely forward direction. The reflector screen includes a sheet of flexible reflective material and a resilient wire reflector frame for holding the reflective sheet taut and for mounting it on the support frame.

3 Claims, 9 Drawing Figures

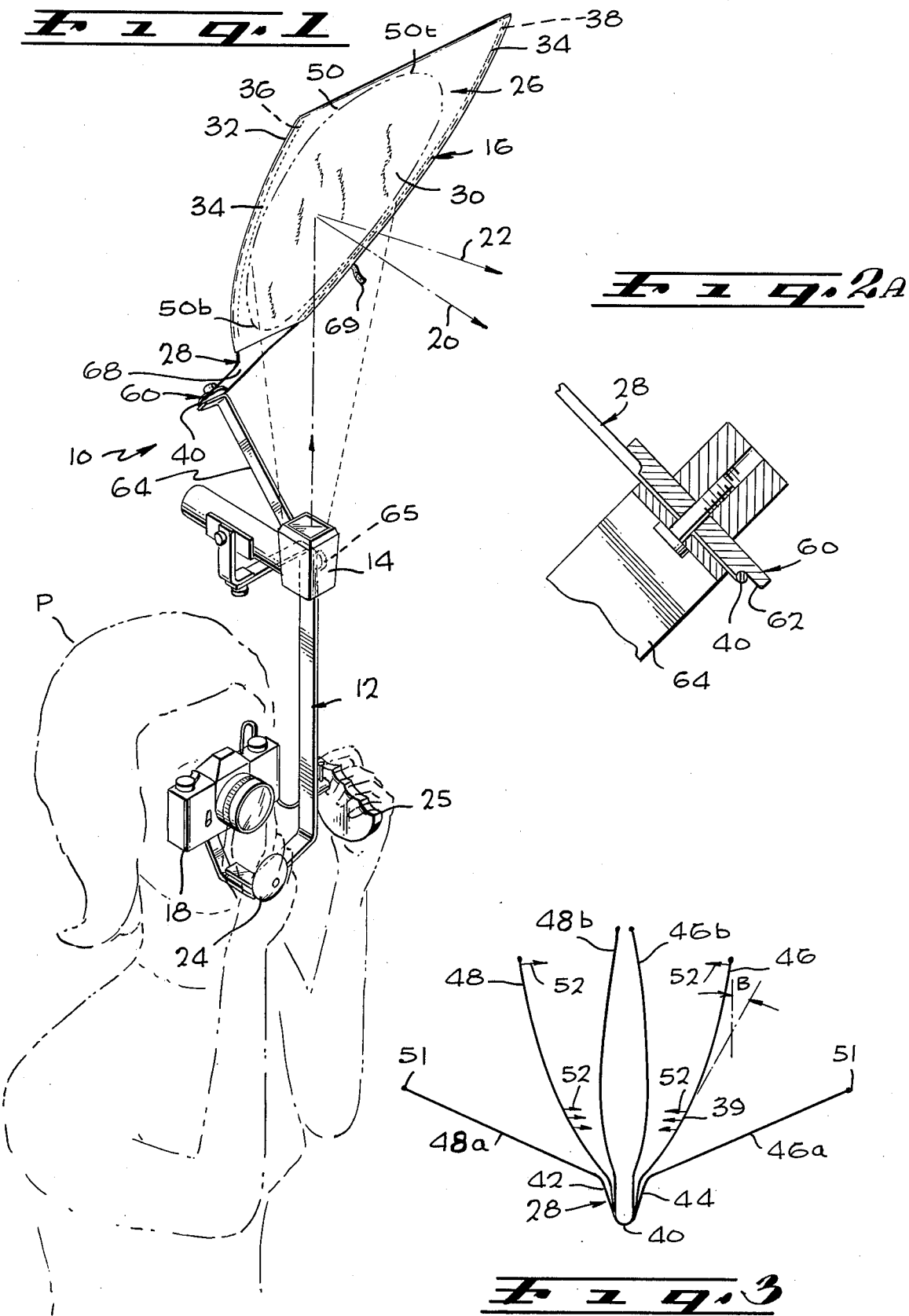

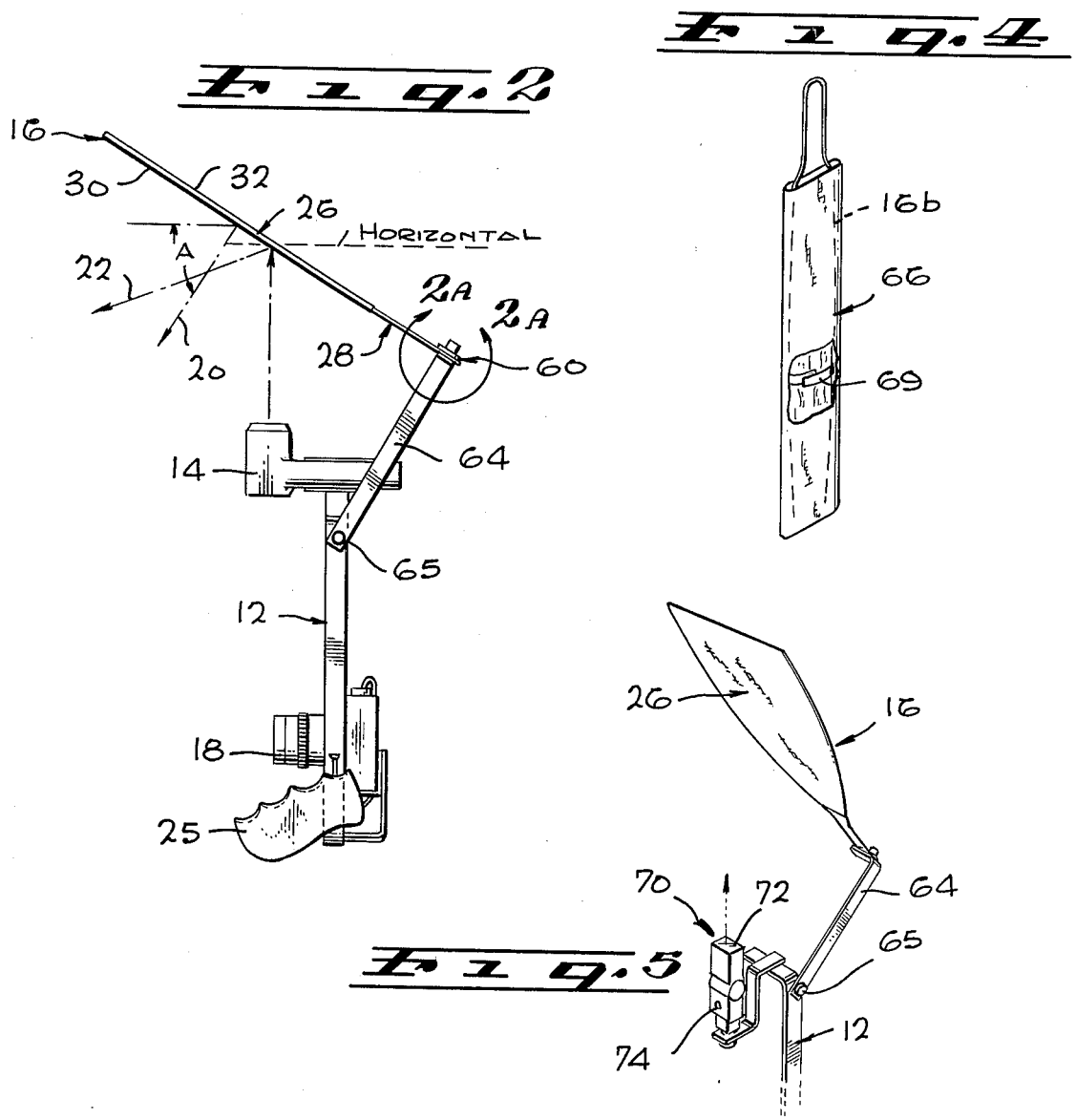
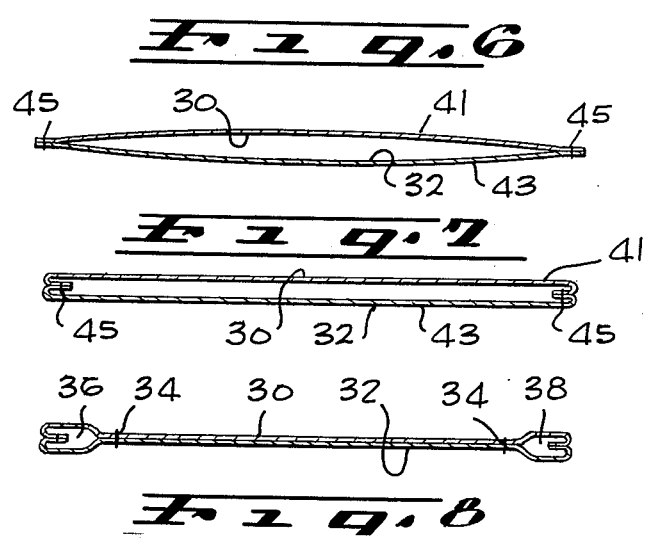

PHOTOGRAPHIC REFLECTOR ACCESSORY

BACKGROUND OF THE INVENTION

This invention relates to photographic reflector apparatus for reflecting light from a source onto a subject to be photographed.

Serious photographers often utilize a reflector when taking pictures with a flash unit, to provide a more diffused light that eliminates harsh shadows and that eliminates locations of very high brightness such as "hot spots" on objects or "pink eye" in the eyes of a person. In the prior art, as shown in U.S. Pat. No. 3,781,535, this has often been accomplished by the use of a support frame which holds a rigid umbrella-like reflector so it faces the subject, and which holds a flash unit so it is aimed directly away from the subject towards the umbrella-like reflector, to reflect light onto the subject. When a camera on the support frame is held at eye level, the flash unit and umbrella reflector are positioned at a considerable distance to one side of the camera, so that the reflector can lie behind the photographer over one of his shoulders. Such an arrangement has been relatively difficult to handle, because of the high torque created by the weight of the flash unit and reflector at one side of the camera, and also has been relatively complex and costly.

SUMMARY OF THE INVENTION

In accordance with one embodiment of the present invention, a photographic reflector apparatus is provided which can be comfortably and easily used and stored, and which is compact and of simple construction. The apparatus includes a support frame, a mount for holding a flash unit so it is aimed upwardly, and a reflector located above the flash unit and facing in a forward and downward direction to reflect light from the flash unit in a largely forward direction. The reflector is formed by a flexible sheet of light-reflecting material and a wire reflector frame which holds the sheet in a taut configuration. The wire frame is formed by a length of wire with its center bent into an approximately 180° loop and its opposite end portion extending apart. The reflector screen of flexible material has opposite sides which are curved, so that when the reflector sheet is held by the end portions of the wire frame, all portions of the flexible sheet are held tautly and the screen lies flat. The supporting frame can hold a camera at eye level, and the reflector screen can lie above and forward of the photographer instead of behind him.

The novel features of the invention are set forth with particularity in the appended claims. The invention will best be understood from the following description when read in conjunction with the accompanying drawings.

BRIEF DESCRIPTION OF THE DRAWINGS

FIG. 1 is a perspective view of a photographic reflector apparatus constructed in accordance with the present invention;

FIG. 2 is a side elevation view of the apparatus of FIG. 1;

FIG. 2A is a view of the area 2A—2A of FIG. 2;

FIG. 3 is a plan view of the reflector wire frame of FIG. 1;

FIG. 4 is a side elevation view showing the reflector of FIG. 1 stored in a storage bag;

FIG. 5 is a partial perspective view of another embodiment of the invention, showing the reflector apparatus of FIG. 2 utilized with another type of flash unit; and FIGS. 6, 7 and 8 are edge views of the reflector screen of FIG. 1, shown during various stages of construction.

DESCRIPTION OF THE PREFERRED EMBODIMENTS

FIG. 1 illustrates the photographic reflector apparatus 10 which includes a support frame 12 for holding a flash unit 14 and reflector 16, as well as a camera 18. The flash unit 14 is held so that it emits light upwardly, while the reflector 16 is held so that it faces in a forward and downward direction, as indicated by arrow 20 which is normal to the reflector surface, so that light from the flash unit is reflected in a largely forward direction as indicated by arrow 22. The support frame 12 includes a pair of handles 24, 25 which can be grasped by a photographer P so that when the camera 18 is held up to the eye and is in a normal orientation, the flash unit and reflector are in the orientations illustrated in the figure, with the reflector lying above the head of the photographer and largely forward of him.

As also illustrated in the other figures, the reflector 16 is formed by a reflector screen 26 and by a wire reflector frame 28 which holds the screen 26 in a flat configuration and which supports the screen on the support frame 12. The screen 26 is formed by a sheet of flexible material such as cloth, with light reflective faces 30, 32, as shown in FIG. 2. One face 30 is of white diffused coloration, to provide highly diffused lighting, while the other face 32 is coated with a silver coating that reflects a higher proportion of light. The reflector screen 26 is formed from two sheets of material with edge portions that are sewn along fastening lines 34, to leave a pair of wire-receiving portions in the form of passages 36, 38 along opposite sides of the sheet. The wire reflector frame 28 is formed by a length of wire of resilient material such as tempered steel. The wire frame, which is best shown in FIG. 3, is bent at its middle portion to form a loop of approximately 180° and 40, and has a pair of outward bends at 42, 44. This results in the end portions 46, 48 of the wire frame tending to extend substantially straight and at a wide angle away from one another, when unrestrained as indicated at 48a, 48a. When the end portions 48a, 48a are partially bent together and are slipped into the passages 36, 38 of the reflector screen, the reflector screen holds the wire end portions closer together than in the unrestrained condition, and in a bowed configuration wherein each wire end portion is bowed away from the opposite end portion, as shown at 46, 48. A pair of rubber covers 51 are attached to the tips of the wire frame end portions to prevent tearing of the screen.

The reflector screen is constructed in the manner illustrated in FIGS. 6-8. Initially two sheets 41, 43 are laid facewise on each other, with one sheet having a diffuse white reflector surface 30 and the other having a silver reflector surface 32, and with the reflector surfaces facing one another. The edges of the sheets are sewn together along sew line 45. The sewn device is then turned inside out to the configuration of FIG. 7. Then the sheets are sewn together along inner fastening lines 34 to form the passages 36, 38.

The shape of the reflector screen 26, as shown in FIG. 1, is chosen so that it reflects substantially all of the light emitted by the flash unit 14 when the apparatus is set up in the illustrated configuration. With the reflector screen 26 extending as shown in FIG. 1, the light from the flash unit illuminates a region indicated at 50, the region 50 being egg-shaped, or in other words oval with a more sharply curved bottom portion 50b than top portion 50t. This is accomplished by utilizing a reflector screen 26 which is substantially triangular, with one point of the triangle truncated. In addition, the opposite sides of the screen along the passages 36, 38, are curved, as described above.

The curving of the opposite sides of the screen along the tunnels 36, 38 is provided so that the screen can be held in a taut condition along its entire length, to allow the screen to lie flat and without wrinkles. This is accomplished by forming the opposite sides of the screen so they are outwardly bowed along substantially the same curve as that which would be formed by the wire end portions 46, 48 if each end portion were pressed inwardly towards the other by forces applied at the tips and the inner regions of the end portions as indicated by the arrows 52 of FIG. 3. When the end portions 46, 48 of the wire frame are inserted into the passages 36, 38 of the reflector screen and pushed therealong, the screen tends to deploy to an unwrinkled and flat configuration. This is because the inner regions 39 of the wire frame end portions extend at a considerable angle B such as 30° from the length direction of the screen which results in the screen portion that contacts the inner region 39 tending to slide further inwardly towards the loop 40.

The reflector 16 is mounted on the support frame 12 by means of a clamp member 60 which has a groove 62 that closely receives the bent middle portion 40 of the reflector frame, and which can be screwed down against a reflector support arm 64 of the support frame. The reflector support arm 64 is oriented so that it holds the reflector facing forwardly and downwardly as illustrated in FIGS. 1 and 2. The arm 64 is designed to be easily attached and detached from the rest of the support frame 12, by a screw 65 with a knob at one end. The rest of the support frame 12, without the arm 64, is described in greater detail in my copending patent application Ser. No. 629,531, filed Nov. 6, 1975. The apparatus is preferably constructed with the reflector screen 26 held, as seen in a side elevation view of FIG. 2, so that the axis or normal line 20 to the reflector screen extends at an angle A of 50° from the horizontal so that light from the flash unit is reflected along a line 22 extending at approximately a 10° downward angle from the horizontal. The knob 65 can be loosened to allow pivoting of the support arm 64 to change this angle slightly to adjust for subjects at different distances, although pivoting by more than about 10° from the illustrated angle A will normally result in an appreciable portion of the light passing outside the area of the reflector and therefore not being reflected.

The reflector 16 can be rapidly detached from the support frame 12, by merely loosening the clamp member 60 and sliding back the reflector 16, until the clamp member 60 lies within an uncovered wide region 68 of the wire frame, which permits the reflector to be removed. The reflector is then compacted by pressing the sides of the screen, at the tunnels 36, 38, together. This causes the end portions 46, 48 of the wire reflector frame to be pressed together as to the orientation shown at 46b, 48b in FIG. 3, and the flexible reflector screen then will be folded. A retaining band 69 (FIG. 4) having Velcro fasteners, is wrapped about the reflector to hold it in its compacted configuration. The compacted reflector shown at 16b in FIG. 4 can then be inserted into a narrow elongated container 66, as indicated in FIG. 4. The container 66 may be constructed of cloth so that it can be easily folded and carried when not used. Compacting or deployment of the reflector 16 can be accomplished quickly and with great ease. The compacted reflector is not only of simple construction, but is of very light weight, such as half that of the previous umbrella-type reflectors. The wire frame of highly resilient material, results in the reflector being highly resistant to damage when "knocked about" in everyday use.

The reflector 16 not only facilitates compacting and deployment, but also permits rapid changing between use of its diffused white face 30 and its silvered face 32. Such changing is accomplished by merely loosening the clamp 60 to remove the reflector, turning the reflector over, and reinstalling the reflector. In order to provide greater variety in lighting, an additional screen with cream and gold reflector surfaces, instead of white and silver surfaces, can be provided, which can be easily installed on the wire frame. The design of the lighting system, with the reflector 16 lying above the flash unit instead of behind it, is advantageous in simplifying the reflector, facilitating its use by enabling the reflector and flash unit to be held substantially over the camera to minimize torques on the support frame, and enabling many flash units to be more efficiently utilized. More efficient utilization is possible for those flash units, such as unit 70 of FIG. 5, that has a swivel head 72 which enables it to direct light upwardly as well as forwardly, and which also has a light sensor 74 that faces forwardly to sense the amount of light falling on the subject and control the exposure.

Thus, the invention provides a photographic reflector apparatus which is of relatively simple design and yet which is versatile and easy to use. This is accomplished by providing a support frame which can hold a flash unit so it directs light upwardly, and which can hold a reflector so it lies over the flash unit and faces forwardly and downwardly to reflect light in a largely horizontal direction towards the subject being photographed. This is also accomplished by the use of a reflector which comprises a resilient wire frame that holds a flexible reflector screen in a taut flat condition during use, and which can be easily folded up for storage. The simple reflector apparatus can be quickly folded into a compact and light weight package for carrying, and can be quickly and easily deployed. The deployed apparatus also can be easily reversed for changing from one reflector surface to another, such as from white to silver.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. Photographic reflector apparatus comprising:
   a reflector frame which includes a wire of resilient material with a middle portion bent in a loop and with opposite wire end portions; and
   a reflector screen of flexible sheet material with a light-reflecting surface, said screen having a pair of opposite sides and a wire-engaging portion extending along each of said sides for engaging a different one of said wire end portions; and
       means for supporting said reflector frame including a support frame, and clamp means for pressing the middle portion of said reflector frame against said support frame including a rounded member for closely receiving the bent middle portion of said reflector frame.

2. Photographic reflector apparatus comprising:
a reflector frame which includes a wire of resilient material with a middle portion bent in a loop and with opposite wire end portions; and
a reflector screen of flexible sheet material with a light-reflecting surface, said screen having a pair of opposite sides and a wire-engaging portion extending along each of said sides for engaging a different one of said wire end portions;
said screen being in the form of a triangle with each of two edges thereof extending along each of said wire end portions, and with a truncated point of said triangle where said two edges would otherwise meet.

3. Photographic reflector apparatus comprising:
a reflector frame which includes a wire of resilient material with a middle part bent in a loop and with opposite wire end portions; and
a reflector screen of flexible sheet material with a light-reflecting surface, said screen having a pair of opposite sides and a wire-engaging portion extending along each of said sides for engaging a different one of said wire end portions;
said looped middle part including a pair of middle wire portions having first ends joined together in a concave curve and having second ends joined to said opposite wire end portions in a pair of convex curves; and
a support frame which includes means for clamping to said looped middle part of said reflector frame near said first ends of said middle wire portions.

* * * * *